United States Patent
Nicholson

(10) Patent No.: US 11,126,000 B2
(45) Date of Patent: Sep. 21, 2021

(54) SYSTEMS, DEVICES, AND METHODS FOR INCREASING RESOLUTION IN WEARABLE HEADS-UP DISPLAYS

(71) Applicant: GOOGLE LLC, Mountain View, CA (US)

(72) Inventor: Stuart James Myron Nicholson, Waterloo (CA)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/749,439

(22) Filed: Jan. 22, 2020

(65) Prior Publication Data
US 2020/0249483 A1 Aug. 6, 2020

Related U.S. Application Data

(60) Provisional application No. 62/802,122, filed on Feb. 6, 2019.

(51) Int. Cl.
*G02B 27/01* (2006.01)
*G09G 3/02* (2006.01)
*G02B 27/10* (2006.01)

(52) U.S. Cl.
CPC ..... *G02B 27/0172* (2013.01); *G02B 27/0179* (2013.01); *G02B 27/104* (2013.01); *G09G 3/025* (2013.01); *G02B 2027/0178* (2013.01); *G02B 2027/0187* (2013.01); *G09G 2354/00* (2013.01)

(58) Field of Classification Search
CPC .... G02B 2027/0123; G02B 2027/0178; G02B 2027/0187; G02B 26/0833; G02B 26/101; G02B 27/0172; G02B 27/0179; G02B 27/104; G02B 27/143; G09G 2354/00; G09G 3/025
See application file for complete search history.

(56) References Cited

U.S. PATENT DOCUMENTS

| | | | | |
|---|---|---|---|---|
| 10,732,407 B1* | 8/2020 | Wood | ............ | G02B 5/18 |
| 2014/0232651 A1* | 8/2014 | Kress | ............ | G06F 3/013 |
| | | | | 345/158 |
| 2018/0101013 A1* | 4/2018 | Moore | ............ | G03H 1/265 |

* cited by examiner

*Primary Examiner* — Kent W Chang
*Assistant Examiner* — Scott D Au

(57) ABSTRACT

Systems, devices, and methods for increasing resolution in wearable heads-up displays (WHUD) are described. A WHUD includes a support structure, a scanning laser projector (SLP), a fold mirror, a split mirror, an optical splitter, and an optical combiner. When the WHUD is worn on the head of a user, the optical combiner is positioned in a field of view of the user. The SLP scans light signals onto the fold mirror which reflects light onto one of at least two reflective surfaces of the split mirror, based on a state of the fold mirror. The split mirror redirects the light signals onto the optical splitter, which, in turn, redirects the light signals towards the optical combiner. The optical combiner redirects the light signals to the eye at exit pupils containing the full usable resolution of the SLP.

19 Claims, 6 Drawing Sheets

SYSTEMS, DEVICES, AND METHODS FOR INCREASING RESOLUTION IN WEARABLE HEADS-UP DISPLAYS

CROSS-REFERENCE TO RELATED APPLICATIONS

This application claims the benefit of U.S. Provisional Application No. 62/802,122, filed Feb. 6, 2019, titled "Systems, Devices, and Methods for Increasing Resolution in Wearable Heads-Up Displays", the content of which is incorporated herein in its entirety by reference.

BACKGROUND

Technical Field

The present systems, devices, and methods generally relate to wearable heads-up displays and particularly relate to increasing resolution in wearable heads-up displays.

Description of the Related Art

Laser Projectors

A projector is an optical device that projects or shines a pattern of light onto another object (e.g., onto a surface of another object, such as onto a projection screen) in order to display an image or video on that other object. A projector necessarily includes a light source, and a laser projector is a projector for which the light source comprises at least one laser. The at least one laser is temporally modulated to provide a pattern of laser light and usually at least one controllable mirror is used to spatially distribute the modulated pattern of laser light over a two-dimensional area of another object. The spatial distribution of the modulated pattern of laser light produces an image at or on the other object. In conventional laser projectors, the at least one controllable mirror may include: a single digital micromirror (e.g., a microelectromechanical system ("MEMS") based digital micromirror) that is controllably rotatable or deformable in two dimensions, or two digital micromirrors that are each controllably rotatable or deformable about a respective dimension, or a digital light processing ("DLP") chip comprising an array of digital micromirrors.

Eyebox

In near-eye optical devices such as rifle scopes and wearable heads-up displays, the range of eye positions (relative to the device itself) over which specific content/imagery provided by the device is visible to the user is generally referred to as the "eyebox." An application in which content/imagery is only visible from a single or small range of eye positions has a "small eyebox" and an application in which content/imagery is visible from a wider range of eye positions has a "large eyebox." The eyebox may be thought of as a volume in space positioned near the optical device. When the eye of the user (and more particularly, the pupil of the eye of the user) is positioned inside this volume and facing the device, the user is able to see all of the content/imagery provided by the device. When the eye of the user is positioned outside of this volume, the user is not able to see at least some of the content/imagery provided by the device.

The geometry (i.e., size and shape) of the eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Furthermore, if a wearable heads-up display that has a small eyebox is designed to align that eyebox on the pupil for some users, the eyebox will inevitably be misaligned relative to the pupil of other users because not all users have the same facial structure. Unless a wearable heads-up display is deliberately designed to provide a glanceable display (i.e., a display that is not always visible but rather is only visible when the user gazes in a certain direction), it is generally advantageous for a wearable heads-up display to have a large eyebox.

Demonstrated techniques for providing a wearable heads-up display with a large eyebox generally necessitate adding more bulky optical components to the display. Technologies that enable a wearable heads-up display of minimal bulk (relative to conventional eyeglass frames) to provide a large eyebox are generally lacking in the art.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, users also care a lot about aesthetics. This is clearly highlighted by the immensity of the eyewear (including eyeglass, sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

BRIEF SUMMARY

A wearable heads-up display may be summarized as including: a support structure; an optical combiner carried by the support structure and positioned in a field of view of a user when the support structure is worn by the user; a scanning laser projector carried by the support structure, the scanning laser projector operable to output light signals; an optical splitter carried by the support structure, the optical splitter comprising at least one optical element arranged to receive the light signals generated by the scanning laser projector and redirect each light signal towards the optical combiner; a split mirror carried by the support structure, the split mirror comprising at least two non-coplanar reflective surfaces to receive the light signals generated by the scanning laser projector and redirect the light signals toward the optical splitter; and a fold mirror carried by the support structure, the fold mirror movable between at least two states, wherein, in each state, the fold mirror is arranged to receive the light signals generated by the scanning laser projector and redirect the light signals toward a respective one of the at least two non-coplanar reflective surfaces of the split mirror.

The fold mirror may be arranged, in a first state, to redirect the light signals toward a first reflective surface of the split mirror. In the first state, the fold mirror may be arranged to not redirect the light signals toward a second reflective surface of the split mirror.

The fold mirror may be arranged, in a second state, to redirect the light signals toward a second reflective surface of the split mirror, the second reflective surface distinct from the first reflective surface. In the first state, the fold mirror may be arranged to not redirect the light signals toward a second reflective surface of the split mirror, and in the second state, the fold mirror may be arranged to not redirect the light signals toward a first reflective surface of the split mirror.

The fold mirror may be arranged, in a third state, to redirect the light signals simultaneously toward the first reflective surface and the second reflective surface of the split mirror.

The WHUD may further include additional fold mirror carried by the support structure, the additional fold mirror movable between at least two additional states, wherein, in each combination of the at least two states and the at least two additional states, the fold mirror and the additional fold mirror are arranged to redirect the light signals toward a respective one of at least four non-coplanar reflective surfaces of the split mirror.

The optical splitter may redirect each light signal towards the optical combiner effectively from one of N spatially-separated virtual positions for the scanning laser projector, where N is an integer greater than 1, the respective virtual position for the scanning laser projector from which a light signal is redirected by the optical splitter determined by a point of incidence at which the light signal is received by the optical splitter.

The support structure may have a shape and appearance of an eyeglass frame.

The WHUD may further include an eyeglass lens carried by the support structure, wherein the optical combiner is carried by the eyeglass lens.

The optical combiner may converge the light signals to at least two exit pupils at or proximate the eye of the user.

The fold mirror may be arranged, in a first state, to redirect the light signals toward a first reflective surface of the split mirror to converge at a first exit pupil of the at least two exit pupils; and in a second state, to redirect the light signals toward a second reflective surface of the split mirror to converge at a second exit pupil of the at least two exit pupils.

The WHUD may further include an eye tracking system carried by the support structure, the eye tracking system to detect a focal point of the eye of the user, wherein the fold mirror is movable between the first state and the second state based on respective proximities of the first exit pupil and the second exit pupil to the focal point.

The fold mirror may be arranged, in a first state, to redirect the light signals toward a first reflective surface of the split mirror to illuminate a first portion of the field of view of the user; and, in a second state, to redirect the light signals toward a second reflective surface of the split mirror to illuminate a second portion of the field of view of the user.

The scanning laser projector may include: a red laser diode to output red laser light; a green laser diode to output green laser light; a blue laser diode to output blue laser light; a beam combiner positioned to combine the red laser light, green laser light, and blue laser light into an aggregate beam; and at least one controllable mirror operable to scan the aggregate beam across the fold mirror.

A method of operating a wearable heads-up display (WHUD), the wearable heads-up display including a scanning laser, a fold mirror movable between at least two states, a split mirror having two or more non-coplanar reflective surfaces, an optical splitter, and an optical combiner positioned within a field of view of an eye of a user when the wearable heads-up display is worn on a head of the user, may be summarized as including: generating a first light signal and a second light signal by the scanning laser projector; receiving, by the fold mirror, the first light signal and the second light signal; redirecting, by the fold mirror in a first state of the at least two states, the first light signal towards a respective first reflective surface of the two or more non-coplanar reflective surfaces of the split mirror; redirecting, by the fold mirror in a second state of the at least two states, the second light signal towards a respective second reflective surface of the two or more non-coplanar reflective surfaces of the split mirror; redirecting, by the split mirror, the first light signal and the second light signal towards the optical splitter; redirecting, by the optical splitter, the first light signal and the second light signal towards the optical combiner; and redirecting, by the optical combiner, the first light signal and the second light signal towards the eye of the user.

The method may further include: generating a third light signal by the scanning laser projector; receiving, by the fold mirror, the third light signal; redirecting, by the fold mirror in a third state, the third light signal towards the first reflective surface and the second reflective surface of the split mirror; redirecting, by the split mirror, the third light signal towards the optical splitter; redirecting, by the optical splitter, the third light signal towards the optical combiner; and redirecting, by the optical combiner, the third light signal towards the eye of the user.

Redirecting, by the optical splitter, the first light signal and the second light signal towards the optical combiner may include: redirecting, by the optical splitter, the first light signal towards the optical combiner effectively from a first one of N spatially-separated virtual positions for the scanning laser projector, where N is an integer greater than 1, the particular virtual position for the scanning laser projector from which the first light signal is redirected by the optical splitter determined by a point of incidence at which the first light signal is received by the optical splitter; and redirecting, by the optical splitter, the second light signal towards the optical combiner effectively from a second one of the N spatially-separated virtual positions for the scanning laser projector, the particular virtual position for the scanning laser projector from which the second light signal is redirected by the optical splitter determined by a point of incidence at which the second light signal is received by the optical splitter.

The method may further include: converging, by the optical combiner the first light signal to one of at least two exit pupils at or proximate the eye of the user.

The method may further include: in the first state, redirecting, by the fold mirror, the first light signal toward the first reflective surface of the split mirror to converge at a first exit pupil of the at least two exit pupils; and in the second state, redirecting, by the fold mirror, the first light signal toward a second reflective surface of the split mirror to converge at a second exit pupil of the at least two exit pupils.

The method may further include: tracking, by an eye tracking system carried by the support structure, a focal point of the eye of the user; and moving the fold mirror between the first state and the second state based on respective proximities of the first exit pupil and the second exit pupil to the focal point.

The method may further include: in the first state, redirecting, by the fold mirror, the light signals toward the first reflective surface of the split mirror to illuminate a first portion of the field of view of the user; and in the second state, redirecting, by the fold mirror, the light signals towards a second reflective surface of the split mirror to illuminate a second portion of the field of view of the user.

Generating the first light signal may include: outputting red laser light by a red laser diode of the scanning laser projector; outputting green laser light by a green laser diode of the scanning laser projector; outputting blue laser light by a blue laser diode of the scanning laser projector; combining, by a beam combiner of the scanning laser projector, the red laser light, the green laser light and the blue laser light into an aggregate beam; and scanning, by at least one controllable mirror, the aggregate beam across the fold mirror.

A method of operating a wearable heads-up display (WHUD), the wearable heads-up display including a scanning laser, a fold mirror movable between at least two states, a split mirror having two or more non-coplanar reflective surfaces, an optical splitter, and an optical combiner positioned within a field of view of an eye of a user when the wearable heads-up display is worn on a head of the user, may be summarized as including: generating a first light signal, a second light signal, a third light signal and a fourth light signal by the scanning laser projector; receiving, by the fold mirror, the first light signal, the second light signal, the third light signal and the fourth light signal; redirecting, by the fold mirror in a first state of the at least two states, the first light signal and the third light signal towards the additional fold mirror; redirecting, by the fold mirror in a second state of the at least two states, the second light signal and the fourth light signal towards the additional fold mirror; redirecting, by the additional fold mirror in a first additional state of the at least two additional states, the first light signal towards a first reflective surface of the four or more non-coplanar reflective surfaces of the split mirror; redirecting, by the additional fold mirror in the first additional state, the second light signal towards a second reflective surface of the four or more non-coplanar reflective surfaces of the split mirror; redirecting, by the additional fold mirror in a second additional state of the at least two additional states, the third light signal towards a third reflective surface of the four or more non-coplanar reflective surfaces of the split mirror; redirecting, by the additional fold mirror in the second additional state, the fourth light signal towards a fourth reflective surface of the four or more non-coplanar reflective surfaces of the split mirror; redirecting, by the split mirror, the first light signal, the second light signal, the third light signal and the fourth light signal towards the optical splitter; redirecting, by the optical splitter, the first light signal, the second light signal, the third light signal and the fourth light signal towards the optical combiner; and redirecting, by the optical combiner, the first light signal, the second light signal, the third light signal and the fourth light signal towards the eye of the user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
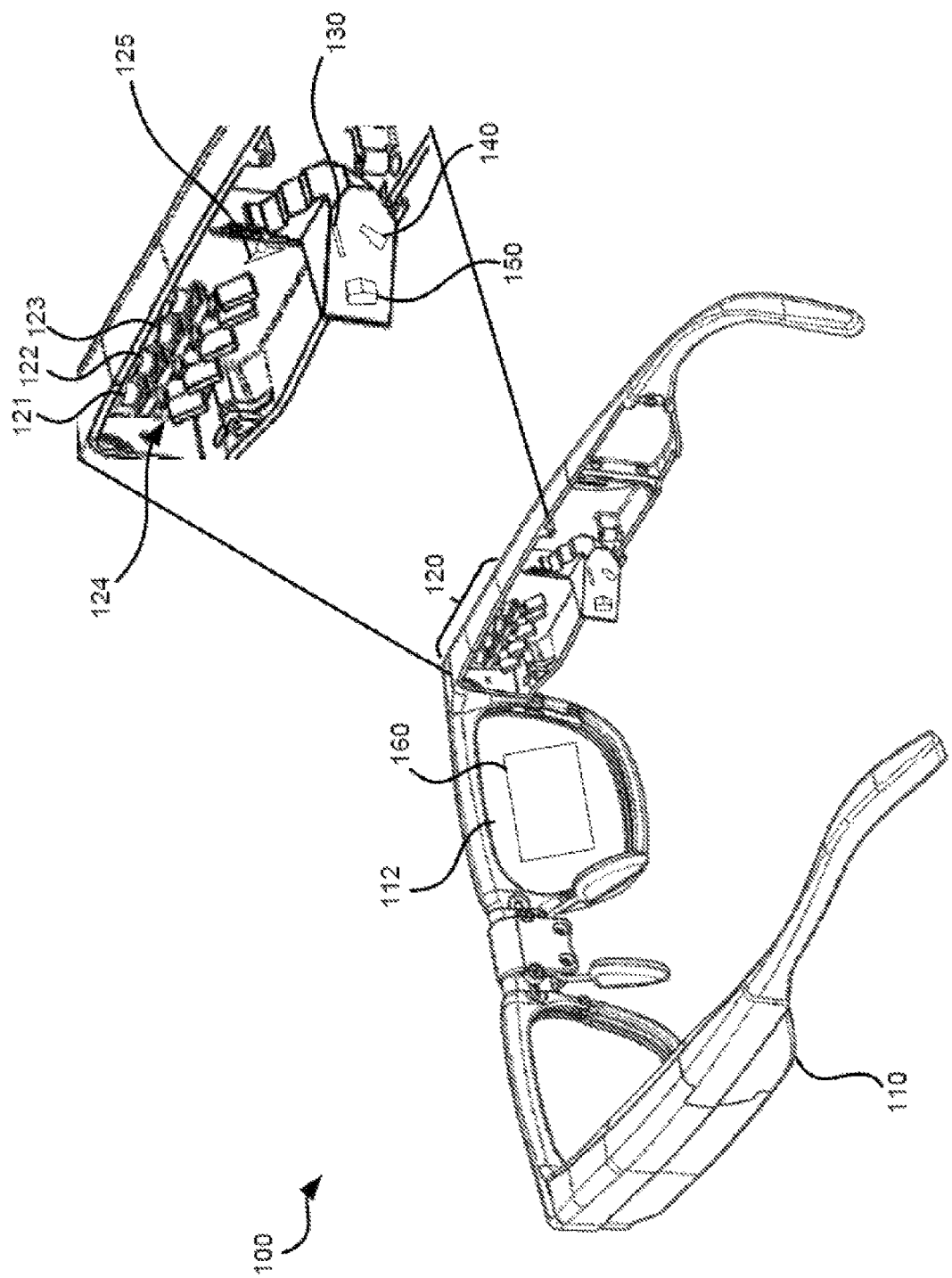
FIG. 1 is a perspective view of a wearable heads-up display in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for splitter optics that, among other potential applications, have particular utility in increasing resolution and/or field of view in scanning laser-based wearable heads-up displays ("WHUDs"). Generally, a scanning laser-based WHUD is a form of virtual retina display in which a scanning laser projector ("SLP") draws a raster scan onto the eye of the user. In the absence of any further measure, the SLP projects light over a fixed area called the exit pupil of the display. In order for the user to see displayed content the exit pupil typically needs to align with, be encompassed by, or overlap with the entrance pupil of the user's eye. The full resolution and/or field of view of the display is visible to the user when the exit pupil of the display is completely contained within the entrance pupil of the eye. For this reason, a scanning laser-based WHUD typically employs a relatively small exit pupil that is equal to or smaller than the expected size of the entrance pupil of the user's eye (e.g., less than or equal to about 4 mm in diameter, sometimes less than or equal to 2 mm in diameter).

The eyebox of a scanning laser-based WHUD is defined by the geometry of the exit pupil of the display at or proximate the eye of the user. A scanning laser-based WHUD that employs a small exit pupil in order to achieve maximum display resolution and/or field of view typically has the drawback of having a relatively small eyebox. For example, the exit pupil may be aligned with the center of the user's eye so that the eye's pupil is located "within the eyebox" when the user is gazing directly ahead but the eye's pupil may quickly leave the eyebox if and when the user glances anywhere off-center. A larger eyebox may be achieved by increasing the size of the exit pupil, but this typically comes at the cost of reducing the display resolution and/or field of view. The eyebox of a scanning laser-based WHUD may be expanded by optically replicating or repeating a relatively small exit pupil and spatially distributing multiple copies or instances of the exit pupil over a relatively larger area of the user's eye, compared to the area of the single exit pupil on its own. In this way, at least one complete instance of the display exit pupil (either as a single instance in its entirety or as a combination of respective portions of multiple instances) may be contained within the perimeter of the eye's pupil for each of a range of eye positions corresponding to a range of gaze directions of the user. In accordance with the present systems, devices and methods, each instance of the exit pupil (or each row of exit pupils, or similar) may utilize the full resolution of the scanning laser projector by switching between states corresponding to the respective instance of the exit pupil (or row of exit pupils, as appropriate). In other words, the present systems, devices, and methods describe increase resolution in exit pupil replication in scanning laser-based WHUDs.

Throughout this specification and the appended claims, the term "replication" and its variants are used (e.g., in the context of "exit pupil replication") to generally refer to situations where multiple instances of substantially the same exit pupil and/or display content are produced. The term "exit pupil replication" is intended to generally encompass approaches that produce concurrent (e.g., temporally parallel) instances of an exit pupil as well as approaches that produce sequential (e.g., temporally serial or "repeated") instances of an exit pupil. Unless the specific context requires otherwise, references to "exit pupil replication" herein include exit pupil replication by exit pupil repetition.

FIG. 1 is a perspective view of a wearable heads-up display (WHUD) 100 in accordance with the present systems, devices, and methods. WHUD 100 includes a support structure 110, a scanning laser projector 120, a fold mirror 130, a split mirror 140, an optical splitter 150, and an optical combiner 160. The support structure 110 is to be worn by a user, for example on a head of the user. The support structure 110 may have the shape and appearance of an eyeglass frame. The support structure 110 may further include an eyeglass lens 112 positioned in a field of view of the user. For example, the eyeglass lens 112 may be near an eye of the user. The eyeglass lens 112 (or any of the eyeglass lenses described herein) can be a prescription lens for correcting vision of a user, or a plano which does not apply any optical power to environmental light which passes therethrough.

The scanning laser projector 120 is carried by the support structure 110 and outputs light signals. The scanning laser projector 120 can include a red laser diode 121 to output red laser light, a green laser diode 122 to output green laser light and a blue laser diode 123 to output blue laser light. The scanning laser projector 120 can further include a beam combiner 124 to combine the red laser light, the green laser light and the blue laser light into an aggregate beam. The beam combiner 124 can include reflective mirrors, beam splitters, dichroic mirrors, a photonic integrated circuit, or other suitable optical elements or combinations of optical elements to combine the red laser light, the blue laser light, and the green laser light into the aggregate beam. In some implementations, the aggregate beam may comprise light from only one of the laser diodes, any two of the laser diodes, or all three of the laser diodes in order to create a full color image. The scanning laser projector 120 can further include at least one controllable mirror 125 to scan the aggregate beam across the fold mirror 130. The controllable mirror 125 may be a single mirror that is rotatable or deformable in two dimensions or may be two mirrors that are each rotatable or deformable in a single dimension (e.g., orthogonal dimensions such as horizontal and vertical). The controllable mirror 125 may raster scan an image onto a surface of the fold mirror 130.

The fold mirror 130 is carried by the support structure 110 and reflects light signals created by the scanning of the aggregate beam toward the split mirror 140. The fold mirror 130 is movable between at least two states. For example, the fold mirror 130 may be rotatable or pivotable about a hinge of the fold mirror, or otherwise mechanically movable between the at least two states.

In each state, the fold mirror 130 is arranged to receive the light signals (e.g., the aggregate beam) generated by the scanning laser projector 120 and redirect the light signals toward the split mirror 140. In particular, the split mirror 140 includes at least two non-coplanar reflective surfaces to receive light signals and redirect the light signals toward the optical splitter 150. In each of the at least two states, the fold mirror 130 is arranged to redirect the aggregate beam toward a respective one of the at least two non-coplanar reflective surfaces of the split mirror 140. For example, in a first state, the fold mirror 130 may be arranged to redirect the light signals toward a first reflective surface of the split mirror 140, and in a second state, the fold mirror 130 may be arranged to redirect the light signals toward a second reflective surface of the split mirror 140, the second reflective surface distinct from the first reflective surface. In some examples, the fold mirror 130 may be further movable to a third state, wherein the fold mirror 130 is arranged to redirect the light signals toward both the first reflective surface and the second reflective surface of the split mirror 140.

The split mirror 140 is carried by the support structure 110 and reflects light signals from the fold mirror 130 toward the optical splitter 150. Optical splitter 150 includes at least two input surfaces and an output surface. Each of the at least two reflective surfaces of the split mirror 140 reflects a set of light signals towards a respective input surface of the optical splitter 150. That is, a first distinct set of light signals reflecting off a first reflective surface of the split mirror 140 is incident on a first input surface of the optical splitter 150, and a second distinct set of light signals reflecting off a second reflective surface of the split mirror 140 is incident on a second input surface of the optical splitter 150.

The optical splitter 150 is carried by the support structure 110 and redirects light signals from the split mirror 140 towards the optical combiner 160. The optical splitter 150 includes at least one optical element arranged to receive light signals and redirect each light signal towards the optical combiner 160. The optical splitter 150 may be configured to redirect each light signal towards the optical combiner 160 effectively from one of N spatially-separated virtual positions for the scanning laser projector 120, where N is an integer greater than 1. Thus, the optical splitter 150 may have N input surfaces to redirect the light signals. The particular virtual position for the scanning laser projector 120 from which a light signal is redirected by the optical splitter 150 is determined by a point of incidence at which the light signal is received by the optical splitter 150. That is, the path of a respective light signal from the optical splitter 150 towards the optical combiner 160 is dependent on the point of incidence of the respective light signal on the optical splitter 150. The input surfaces of the optical splitter 150 are oriented and positioned to alter the path of the respective light signals incident thereon such that the two sets of light signals appear to be originating from spatially-separated virtual positions. The virtual positions are separated by more than the actual physical positions of the points of incidence of the light signals on the input surfaces.

The optical combiner 160 is carried by the support structure 110 and positioned in a field of view of the user when the support structure 110 is worn by the user. For example, the optical combiner 160 may be carried on the eyeglass lens 112. The optical combiner 160 receives light signals from the optical splitter 150 and redirects the light signals towards the eye of the user. In some implementations, the optical combiner 160 may converge the light signals to exit pupils at or proximate the eye of the user. Each set of light signals originating from spatially-separated virtual positions corresponds to a spatially-separated exit pupil at the eye of the user. These exit pupils may show the same image resulting in exit pupil replication at the eye of the user. WHUD 100 may have N number of spatially-separated exit pupils, where N is an integer greater than 1. In some implementations, the optical combiner 160 may be a holographic combiner which allows environmental light to pass through to the eye of the user while redirecting the light signals toward the eye of the user such that the environmental light and light signals are "combined" and both are visible to the user. The holographic combiner may include at least one hologram, volume diffraction grating, surface relief diffraction grating, and/or reflection grating.

The optical splitter 150 and WHUD 100 may be similar to the optical splitter and the wearable heads-up display described in U.S. Non-Provisional patent application Ser. No. 15/147,638 (hereafter "Ser. No. 15/147,638") and US Patent Application Publication No. 2016-0377866 A1/U.S. Non-Provisional patent application Ser. No. 15/046,254 (hereafter "2016-0377866"). The wearable heads-up display of both Ser. No. 15/147,638 and 2016-0377866 has a housing for the optical splitter (Ser. No. 15/147,638 and 2016-0377866, both FIG. 1, element 150) that juts out from the surrounding support structure in order to create an optimal distance between the scanning laser projector, specifically the scan mirror, and the optical splitter. This architecture is functional but for a more fashionable wearable heads-up display a smaller housing is desirable. The optical splitter and controllable mirror of Ser. No. 15/147,638 and 2016-0377866 could be brought closer together to decrease the size of the housing if the scan range of the controllable mirror was increased, but this would decrease the quality of the image created. The split mirror 140 can be useful to bring the optical splitter and controllable mirror closer together while maintaining image quality. The split mirror 140 may be similar to the split mirror described in US Patent Application Publication No. 2018-0321494 A1/U.S. Non-Provisional patent application Ser. No. 15/970,631 (hereafter 2018-0321494), US Patent Application Publication No. 2018-0321495 A1/U.S. Non-Provisional patent application Ser. No. 15/970,645 (hereafter 2018-0321495), and U.S. Provisional Patent Application Ser. No. 62/501,587.

Figure 2A:
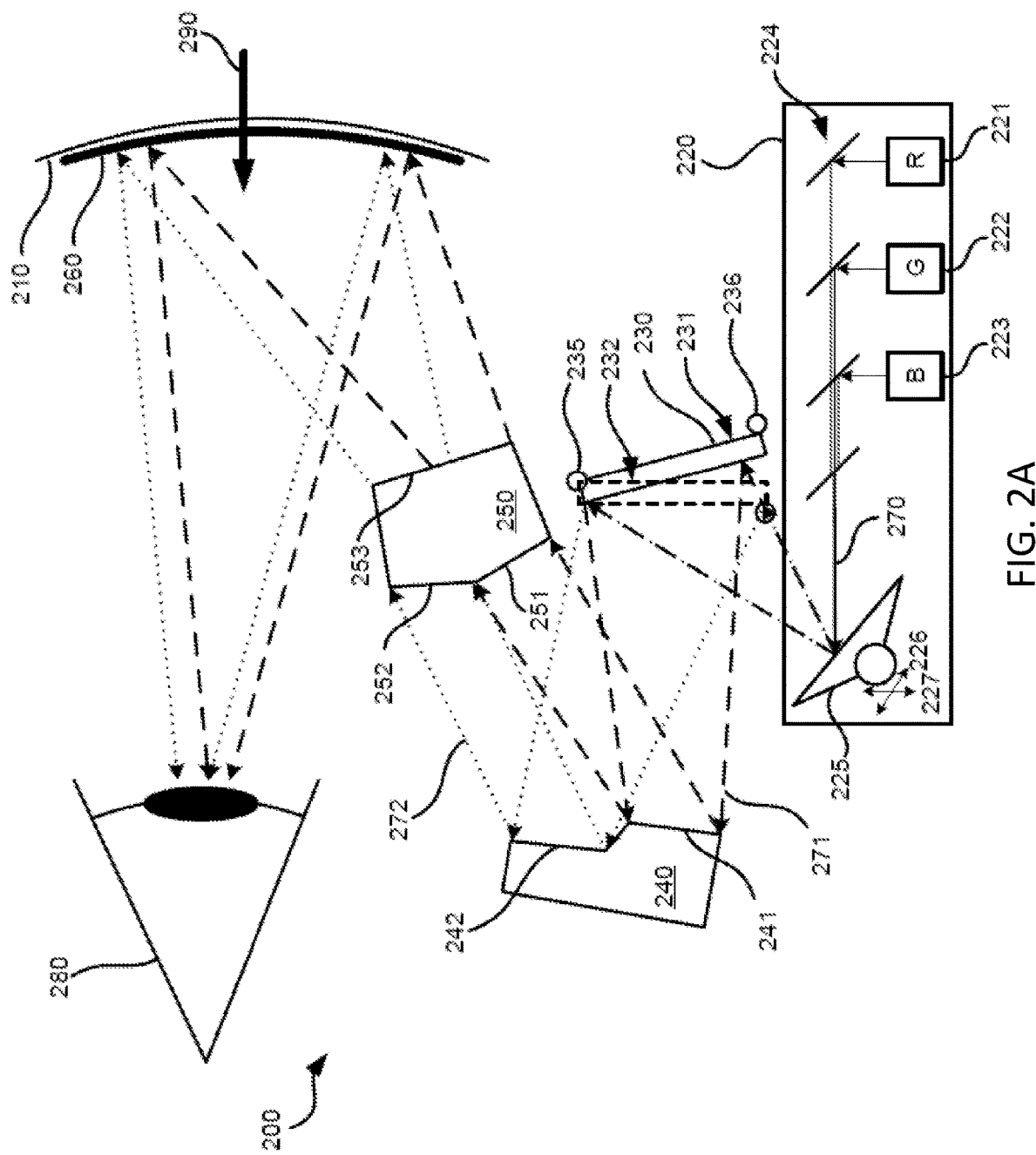
FIGS. 2A, 2B, and 2C are schematic diagrams of wearable heads-up displays in accordance with the present systems, devices, and methods.

FIG. 2A is a schematic diagram of a wearable heads-up display 200 in accordance with the present systems, devices, and methods. The WHUD 200 may be similar to the WHUD 100 of FIG. 1 and includes a support structure (not shown), a scanning laser projector 220, a fold mirror 230, a split mirror 240, an optical splitter 250 and an optical combiner 260 carried on an eyeglass lens 210. The support structure of the WHUD 200 is to be worn on the head of a user and may have the shape and appearance of eyeglasses.

The scanning laser projector 220 generates light signals. In the illustrated example, a red laser diode 221 generates red laser light, a green laser diode 222 generates green laser light, and a blue laser diode 223 generates blue laser light. A beam combiner 224 of the scanning laser projector 220 combines the red laser light, green laser light, and blue laser light into an aggregate beam 270 and directs the aggregate beam 270 towards a controllable mirror 225. The controllable mirror 225 scans the aggregate beam 270 onto the fold mirror 230 in a first direction 226 and a second direction 227 orthogonal to the first direction. The controllable mirror 225 may be a single mirror (e.g., a microelectromechanical system ("MEMS") based digital micromirror) that is controllably rotatable or deformable in two dimensions (i.e., in the first direction 226 and the second direction 227), or two mirrors that are each controllably rotatable or deformable about a respective dimension. In practice, different wavebands of laser diodes could be used, more or less laser diodes could be used, and/or the order of laser diodes could be changed. Further, the illustrated example shows a beam combiner 224 having wavelength-selective reflectors. In practice, different beam combiner structures could be used, such as a photonic integrated circuit for example.

The fold mirror 230 includes a reflective surface arranged to receive the aggregate beam 270 from the controllable mirror 225. The fold mirror 230 is positioned to receive preferably 90% and further preferably 100% of the light scanned from the controllable mirror 225 while maximizing the area of the reflective surfaces upon which light is incident. That is, preferably, the fold mirror 230 is sized and positioned such that the dimensions of the reflective surface of the fold mirror 230 are preferably the same as or larger than the dimensions of the scan area of the controllable mirror 225 when the aggregate beam 270 is scanned over the fold mirror 230. The fold mirror 230 is movable between a first state 231 (shown in solid line) and a second state 232 (shown in short dashed line). The fold mirror 230 is rotatable about a hinge 235 between stoppers 236 defining the first state 231 and the second state 232 respectively. In other implementations, the fold mirror 230 may include other mechanical means of discretely defining the first state 231 and the second state 232. For example, the fold mirror could be a MEMS mirror which is rotatable between the first state 231 and the second state 232. As another example, the fold mirror could rotate on a rotor instead of a hinge. The inclusion of a stopper is optional, so long as the fold mirror 230 can be accurately controlled to be in each of the desired states.

The split mirror 240 includes two non-coplanar reflective surfaces 241 and 242, which receive light signals from the fold mirror 230 and redirect the light signals towards the optical splitter 250, as described in further detail below. The optical splitter 250 has two input surfaces 251 and 252, which are not coplanar, and one output surface 253 positioned across a thickness of the optical splitter 250 from the input surfaces 252 and 252.

In operation, when the fold mirror 230 is in the first state 231, the fold mirror 230 redirects light signals 271 (shown in long dashed line representing outer boundaries of the light signals 271) towards the first reflective surface 241 of the split mirror 240. Accordingly, the reflective surfaces of the split mirror 240 are positioned to receive preferably 90% and further preferably 100% of the light signals reflected from the fold mirror 230 while maximizing the area of the reflective surfaces upon which light is incident. The split mirror 240 reflects the light signals 271 off the first reflective surface 241 towards the first input surface 251 of the optical splitter 250. The optical splitter 250 is positioned to receive preferably 90% and further preferably 100% of the light reflected by the split mirror 240 while maximizing the area of the input surfaces upon which light is incident. In other implementations, the optical splitter 250 may have more than two non-coplanar input surfaces, and each of the first reflective surface 241 and the second reflective surface 242 may direct light to more than one input surface. For example, the optical splitter 250 may have four input surfaces and the first reflective surface 241 may redirect light to first and second input surfaces while the second reflective surface 242 may redirect light to third and fourth input surfaces. The optical splitter 250 directs the light signals 271 towards the optical combiner 260. Light signals 271 are redirected by the optical combiner 260 towards an eye 280 of a user.

When the fold mirror 230 is in the second state 232, the fold mirror redirects light signals 272 (shown in dotted line representing outer boundaries of the light signals 272) towards the second reflective surface 242 of the split mirror 240. The split mirror 240 reflects the light signals 272 off the second reflective surface 242 towards the second input surface 252 of the optical splitter 250. The optical splitter 250 directs the light signals 272 towards the optical combiner 260. In particular, the light signals 271 and the light signals 272 are redirected towards the optical combiner 260 from two spatially-separated virtual positions. That is, the path of a respective light signal (from the light signals 271 or the light signals 272) from the optical splitter 250 to the optical combiner 260 is determined by the point of incidence and the angle of incidence of the light signal on the optical splitter 250. The point of incidence and angle of incidence of a respective light signal on optical splitter 250 is determined by the reflection of the respective light signal from a respective reflective surface (i.e., from the first reflective surface 241 or the second reflective surface 242) of the split mirror 240. The reflection of the respective light signal from a respective reflective surface, in turn, is determined by the reflection of the respective light signals from the fold mirror 230 in the first state 231 or the second state 232. The light signals 272 are redirected by the optical combiner 260 towards the eye 280 of the user.

Because the light signals 271 and the light signals 272 are directed from two spatially-separated virtual positions, they are also incident at the eye 280 at two spatially-separated exit pupils. In this way, the eyebox of the wearable heads-up display is advantageously increased in size. Each of the light signals 271 and the light signals 272 can represent the same image, resulting in exit pupil replication at the eye 280 of the user. Alternatively, each of the light signals 271 and the light signals 272 can represent different portions of an image, resulting in an increased field of view where different portions of the display can be visible depending on where the user is looking. Environmental light 290 in the field of view of the eye 280 passes through the eyeglass lens 210 and the optical combiner 260, allowing the user to see both the display and their environment. Further, the light signals 271 and the light signals 272 include the entire usable resolution of the scanning laser projector 220, and hence each corresponding exit pupil also contains the entire usable resolution of the scanning laser projector 220, thereby increasing the resolution at the exit pupils. Although it might be possible to achieve a similar selection effect of the reflective surface of the split mirror 240 by controlling the controllable mirror 225 to only scan over a single reflective surface, this will be error prone and prone to aberrations and artifacts. By using the fold mirror 230 movable between at least two states, alteration of the operation of the controllable mirror 225 is minimized. Further, the fold mirror 230 need only be actuated (i.e., moved between the two or more states) at a display framerate of the WHUD 200, such as 15-60 Hz, since the illuminated exit pupil will not need to be changed more than once per frame.

In some implementations, the WHUD 200 may include an eye tracking system wherein the scanning laser projector 220 includes an infrared diode. Infrared laser light may be scanned onto the eye 280 and reflected infrared light is captured and analyzed to determine a position of any number of features (e.g., pupil, cornea, etc.) of the eye 280. In particular, the eye tracking system may detect a focal point of the eye of the user. Exemplary eye-tracking systems are described in at least U.S. Non-Provisional patent application Ser. No. 15/167,458, U.S. Non-Provisional patent application Ser. No. 15/827,667, and U.S. Provisional Patent Application Ser. No. 62/658,436.

The WHUD 200 may be configured to direct the entire useable resolution of the scanning laser projector 220 towards a single exit pupil (or a single row of exit pupils) at which the user is looking by controlling the fold mirror 230 to move to the appropriate state. For example, the fold mirror 230 may be movable based on respective proximities of the exit pupils to the focal point of the eye of the user. That is, the fold mirror 230 may be moved to the first state 231 to converge the light signals at a first exit pupil when the focal point of the eye of the user is closer to the first exit pupil, and to the second state 232 to converge the light signals at a second exit pupil when the focal point of the eye of the user is closer to the second exit pupil.

In further implementations, the fold mirror 230 may be controlled to selectively illuminate portions of the display as required for a given user interface (e.g., a bar at a top/left/bottom/right of the screen). Accordingly, the fold mirror 230 may be arranged to redirect the light signals 271 toward a first reflective surface of the split mirror 240 to illuminate a first portion of the field of view of the user in a first state, and in a second state, redirect the light signals 272 toward a second reflective surface of the split mirror 240 to illuminate a second portion of the field of view of the user.

In some implementations, the fold mirror 230 may redirect the light signals reflected from the controllable mirror 225 over more than one reflective surface of the split mirror 240.

Figure 2B:
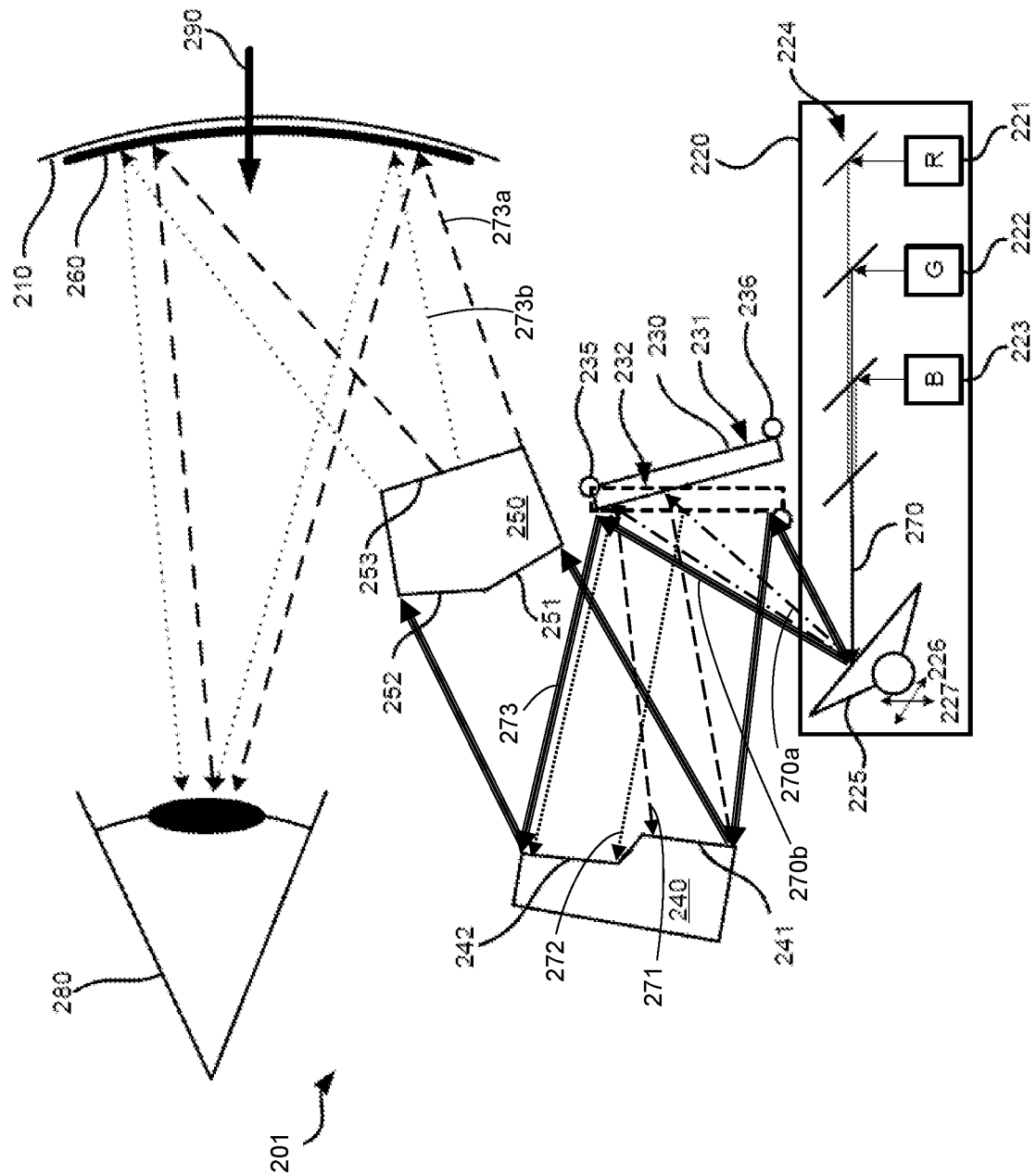

FIG. 2B is a schematic diagram illustrating one exemplary implementation of a WHUD 201 in which fold mirror 230 redirects light signals reflected from the controllable mirror 225 over more than one reflective surface of the split mirror 240. The description of WHUD 200 in FIG. 2A above is applicable at least in part to WHUD 201 in FIG. 2B unless context dictates otherwise. The fold mirror 230 may be operable in a third state that redirects the light signals simultaneously towards both the first reflective surface 241 and the second reflective surface 242. For example, the controllable mirror 225 may be shaped and operated to scan the aggregate beam 270 across a portion of the fold mirror 230 in either the first state 231 or the second state 232, and may be further shaped and operated to scan the aggregate beam 270 across a larger portion (i.e., a portion of the fold mirror 230 having a relatively larger area) to achieve the third state. This is shown in FIG. 2B as detailed below.

For the first state 231 and second state 232, beam 270 is scanned by controllable mirror 225 over a first range with boundaries 270a shown by dashed and dotted lines. In operation, when the fold mirror 230 is in the first state 231, the fold mirror 230 redirects scanned beam 270 as light signals 271 (shown in long dashed line representing outer boundaries of the light signals 271) towards the first reflective surface 241 of the split mirror 240. When the fold mirror 230 is in the second state 232, the fold mirror redirects scanned beam 270 as light signals 272 (shown in dotted line representing outer boundaries of the light signals 272) towards the second reflective surface 242 of the split mirror 240. The split mirror 240 will redirect light signals 271 and 272 towards optical splitter 250. To reduce clutter, the optical path of light signals 271 and 272 redirected from the split mirror 240 is not illustrated in FIG. 2B, but can be similar to that described with reference to FIG. 2A.

For the third state, beam 270 is scanned by controllable mirror 225 over a second range with boundaries 270b as shown by triple-lines. In operation, the fold mirror 230 redirects scanned beam 270 as light signals 273 (shown in triple lines representing outer boundaries of the light signals 273) towards both the first reflective surface 241 and the second reflective surface 242 of the split mirror 240. The split mirror 240 will redirect light signals 273 towards both the first input surface 251 and the second input surface 252 of the optical splitter 250. The optical splitter 250 directs the light signals 273 towards the optical combiner 260. In particular, the light signals 273 are split by the optical splitter 250 into light signals 273a and 273b, and redirected towards the optical combiner 260 from two spatially-separated virtual positions. That is, the path of a respective light signal from the optical splitter 250 to the optical combiner 260 is determined by the point of incidence and the angle of incidence of the light signal on the optical splitter 250. The point of incidence and angle of incidence of a respective light signal on optical splitter 250 is determined by the reflection of the respective light signal from a respective reflective surface (i.e., from the first reflective surface 241 or the second reflective surface 242) of the split mirror 240. The light signals 273a and 273b are redirected by the optical combiner 260 towards the eye 280 of the user.

In the above implementation, the third state is achieved without requiring that the fold mirror move to a position different from the first state and the second state. In FIG. 2B, to achieve the third state, light signals 273 are shown as being redirected from fold mirror 230 when fold mirror 230 is in the position of second state 232. However, the third state could also be achieved by redirecting light signals 273 from fold mirror 230 when fold mirror 230 is in the position of first state 231.

As an example of the above implementation, the controllable mirror 225 may be operated to scan the aggregate beam 270 across a first half of the fold mirror 230 in the first state 231 and a second half of the fold mirror 230 in the second state 232, and may be further operated to scan the aggregate beam 270 across the entire fold mirror 230 in the third state.

Further, in other implementations, the third state can be achieved by the fold mirror being in a different position and/or rotation from the first state and the second state. For example, the fold mirror could be rotated at an angle different from the first state and the second state. As another example described with reference to FIG. 2C below, the fold mirror could be shifted to achieve the first state, second state, and third state.

Figure 2C:
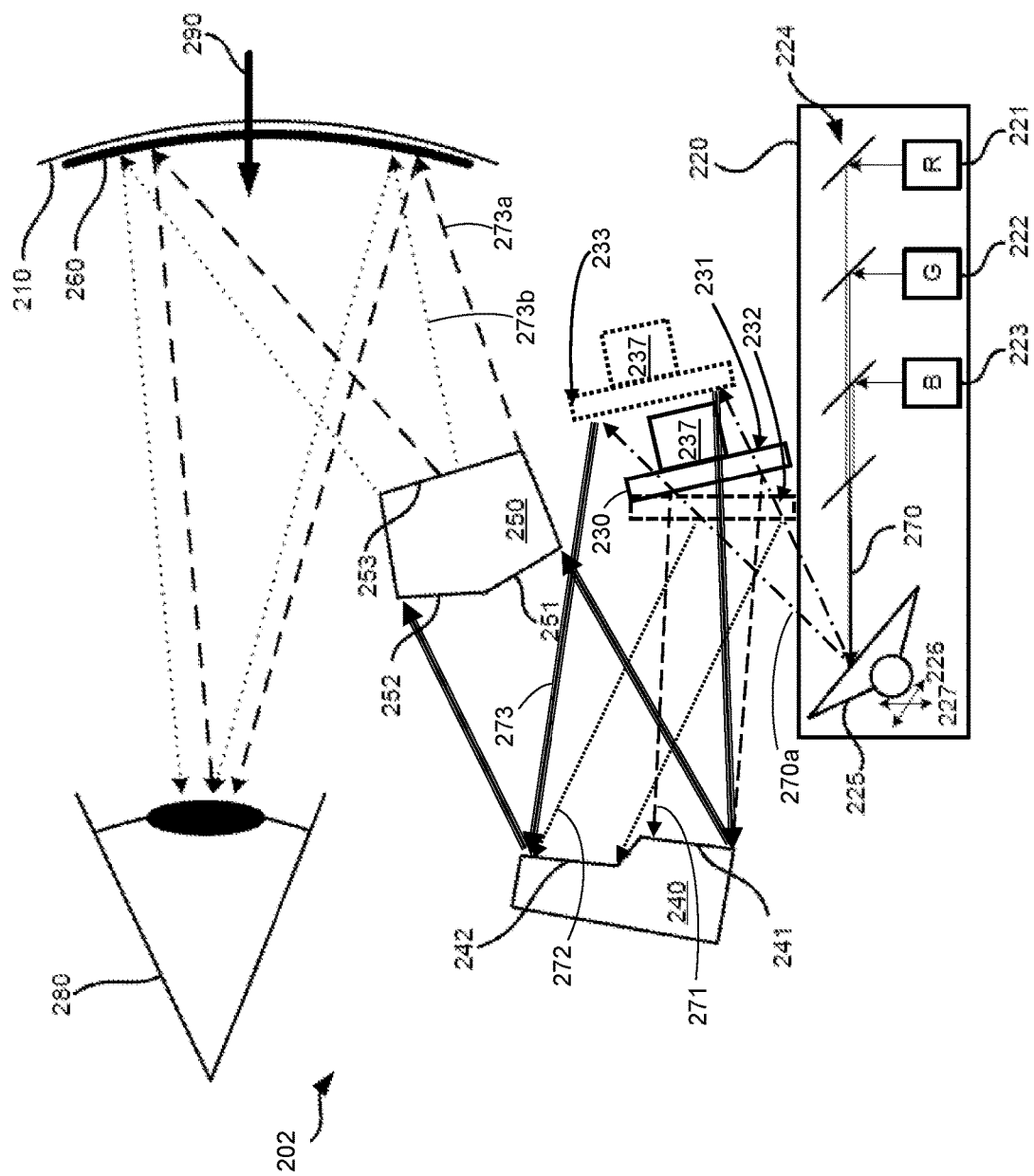

FIG. 2C is a schematic diagram illustrating one exemplary implementation of a WHUD 202 in which fold mirror 230 redirects light signals reflected from the controllable mirror 225 over more than one reflective surface of the split mirror 240. The description of WHUD 200 in FIG. 2A above is applicable at least in part to WHUD 202 in FIG. 2C unless context dictates otherwise. The fold mirror 230 may be operable in a third state 233 shown in dotted lines that redirects the light signals simultaneously towards both the first reflective surface 241 and the second reflective surface 242.

For each of first state 231, second state 232, and third state 233, beam 270 is scanned by controllable mirror 225 over a range with boundaries 270a shown by dashed and dotted lines. In operation, when the fold mirror 230 is in the first state 231, the fold mirror 230 redirects scanned beam 270 as light signals 271 (shown in long dashed line representing outer boundaries of the light signals 271) towards the first reflective surface 241 of the split mirror 240. When the fold mirror 230 is in the second state 232, the fold mirror redirects scanned beam 270 as light signals 272 (shown in dotted line representing outer boundaries of the light signals 272) towards the second reflective surface 242 of the split mirror 240. The split mirror 240 will redirect light signals 271 and 272 towards optical splitter 250. To reduce clutter, the optical path of light signals 271 and 272 redirected from the split mirror 240 is not illustrated in FIG. 2C, but can be similar to that described with reference to FIG. 2A.

In the third state, the fold mirror 230 redirects scanned beam 270 as light signals 273 (shown in triple lines representing outer boundaries of the light signals 273) towards both the first reflective surface 241 and the second reflective surface 242 of the split mirror 240. The split mirror 240 will redirect light signals 273 towards both the first input surface 251 and the second input surface 252 of the optical splitter 250. The optical splitter 250 directs the light signals 273 towards the optical combiner 260. In particular, the light signals 273 are split by the optical splitter 250 into light signals 273a and 273b, and redirected towards the optical combiner 260 from two spatially-separated virtual positions. That is, the path of a respective light signal from the optical splitter 250 to the optical combiner 260 is determined by the point of incidence and the angle of incidence of the light signal on the optical splitter 250. The point of incidence and angle of incidence of a respective light signal on optical splitter 250 is determined by the reflection of the respective light signal from a respective reflective surface (i.e., from the first reflective surface 241 or the second reflective surface 242) of the split mirror 240. The light signals 273a and 273b are redirected by the optical combiner 260 towards the eye 280 of the user.

One difference between WHUD 202 in FIG. 2C and WHUD 201 in FIG. 2B is that in WHUD 202, the third state is achieved by moving the fold mirror 230 to a position different from the first state 231 and the second state 232. In FIG. 2C, this is achieved by translating fold mirror 230 using a translatable mount 237 which is attached to fold mirror 230. Translatable mount 237 could for example by a piezoelectric element, MEMS device, or other element which can be translated. In some implementations, Translatable mount 237 and fold mirror 230 could be a single element, such as a MEMS mirror which is deflectable and rotatable. To reduce clutter, translatable mount 237 is illustrated as being coupled to fold mirror 230 only in first state 231 and third state 233, but translatable mount 237 can also be coupled to fold mirror 230 in second state 232. Further, translatable mount 237 can also act as a rotatable mount, such as a deflectable and rotatable MEMS device, which can control both position and angular rotation of fold mirror 230. Additionally, first state 231 and second state 232 are not limited to being defined by a difference in rotation of fold mirror 230; similarly, third state 233 is not limited to being defined as a difference in position of fold mirror relative to the first state 231 and second state 232. Rather, any combination of rotation and/or position can be used to define each of the three states.

Advantageously, by having a different position and or rotation of fold mirror 230 for each of the first state 231, second state 232, and third state 233, each of the three states can be achieved without altering operation of controllable mirror 225. This increases modularity of the system and prevent aberrations and artifacts caused by altering operation of controllable mirror 225.

Figure 3A:
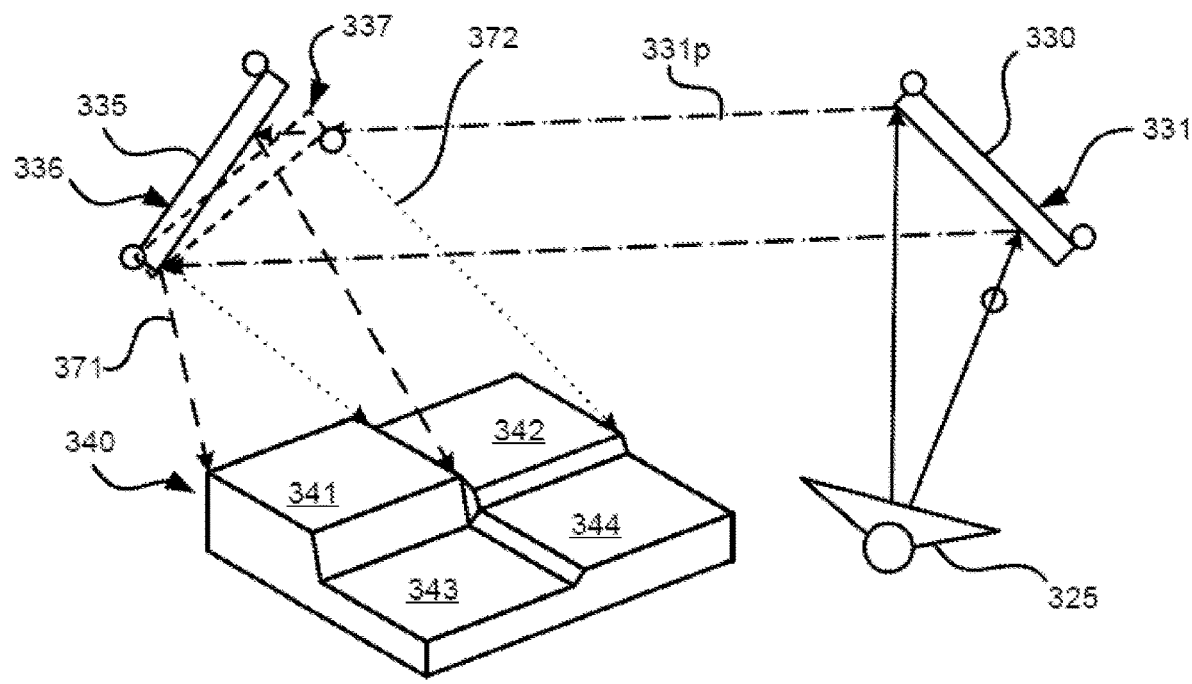
FIGS. 3A and 3B are schematic diagrams of a split mirror and two fold mirrors of a wearable heads-up display in accordance with the present systems, device and methods.
Figure 3B:
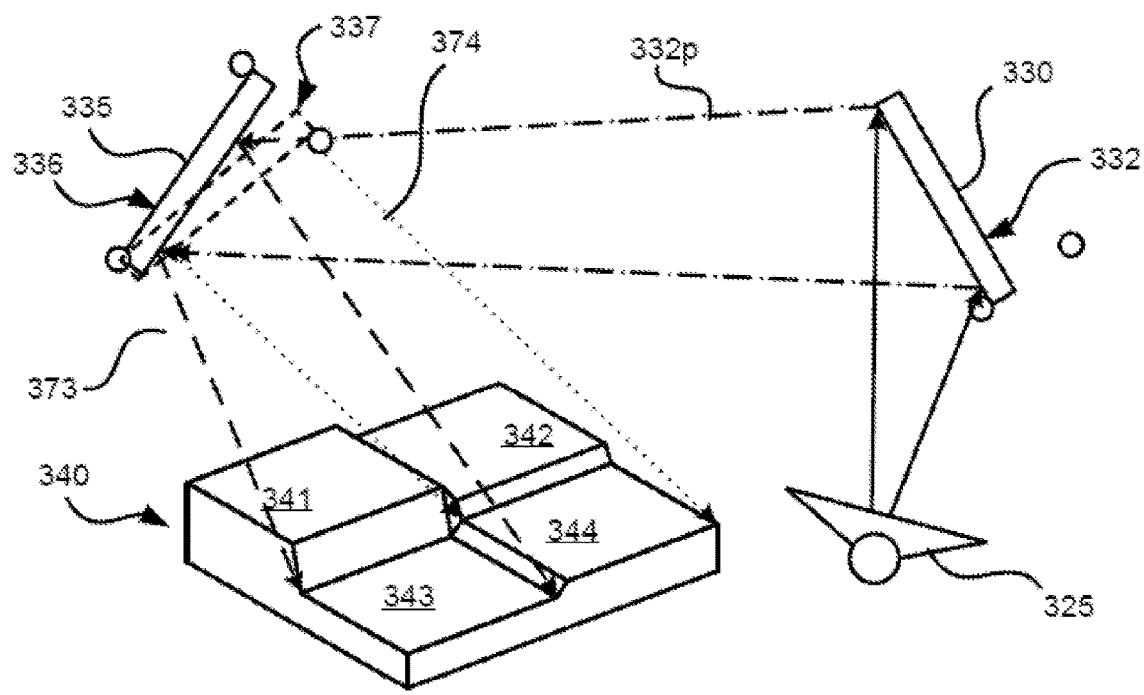

FIGS. 3A and 3B are schematic diagrams of a split mirror 340 and two fold mirrors 330 and 335 of a wearable heads-up display in accordance with the present systems, device and methods. The wearable heads-up display may be similar to the WHUD 100 and the WHUD 200 and includes a support structure (not shown), a scanning laser projector (not fully shown), the two fold mirrors 330 and 335, the split mirror 340, an optical splitter (not shown) and an optical combiner (not shown). The scanning laser projector may include laser diodes to generate laser light, a beam combiner to combine laser light into an aggregate beam (if there are multiple laser diodes), and a controllable mirror 325.

The fold mirrors 330 and 335 are similar to the fold mirror 130 of FIG. 1 and the fold mirror 230 of FIG. 2. The fold mirror 330 is movable between a first state 331 (shown in FIG. 3A) and a second state 332 (shown in FIG. 3B). The fold mirror 335 is movable between a respective first state 336 (shown in solid line in FIGS. 3A and 3B) and a respective second state 337 (shown in short dashed line in FIGS. 3A and 3B). The split mirror is similar to the split mirror 140 of FIG. 1 and the split mirror 240 of FIG. 2 but includes four non-coplanar reflective surfaces 341, 342, 343, and 344. Each of the reflective surfaces 341, 342, 343, and 344 may, for example, itself be planar, yet each of the reflective surfaces 341, 342, 343, and 344 is not planar with the other ones of the reflective surfaces 341, 342, 343, and 344.

In operation, the aggregate beam generated by the laser diodes and incident on controllable mirror 325 is scanned onto the first fold mirror 330. As depicted in FIG. 3A, in the first state 331, the first fold mirror 330 redirects light signals 371 and 372 (shown, respectively, in dashed line and dotted line representing outer boundaries of the light signals) along a first path 331p towards the second fold mirror 335. The second fold mirror 335, in its respective first state 336, redirects the light signal 371 towards the first reflective surface 341, and in its respective second state 337, redirects the light signal 372 towards the second reflective surface 342. Similarly, as depicted in FIG. 3B, in the second state 332, the first fold mirror redirects light signals 373 and 374 (shown, respectively, in dashed line and dotted line representing outer boundaries of the light signals) along a second path 332p towards the second fold mirror 335. The second fold mirror 335, in its respective first state 336, redirects the light signals 373 towards the third reflective surface 343, and in its respective second state 337, redirects the light signals 374 towards the fourth reflective surface 344. Accordingly, the first fold mirror 330 allows selection of the reflective surfaces of the split mirror 340 in a first direction, and the second fold mirror 335 allows selection of the reflective surfaces of the split mirror 340 in a second direction, thereby allowing each of the four surfaces 341, 342, 343, and 344 to be selected, thus increasing the resolution in both axes. Although fold mirror 330 and fold mirror 335 are shown in FIGS. 3A and 3B as rotating within the same plane, it is possible for fold mirror 330 and fold mirror 335 to rotate in different planes. For example, fold mirror 330 may rotate around an axis orthogonal to an axis around which fold mirror 335 rotates. In other implementations, a single fold mirror 330 may be movable between four states (e.g., by rotating or pivoting on two axes) to allow selection of each of the four surfaces 341, 342, 343, and 344.

Figure 4:
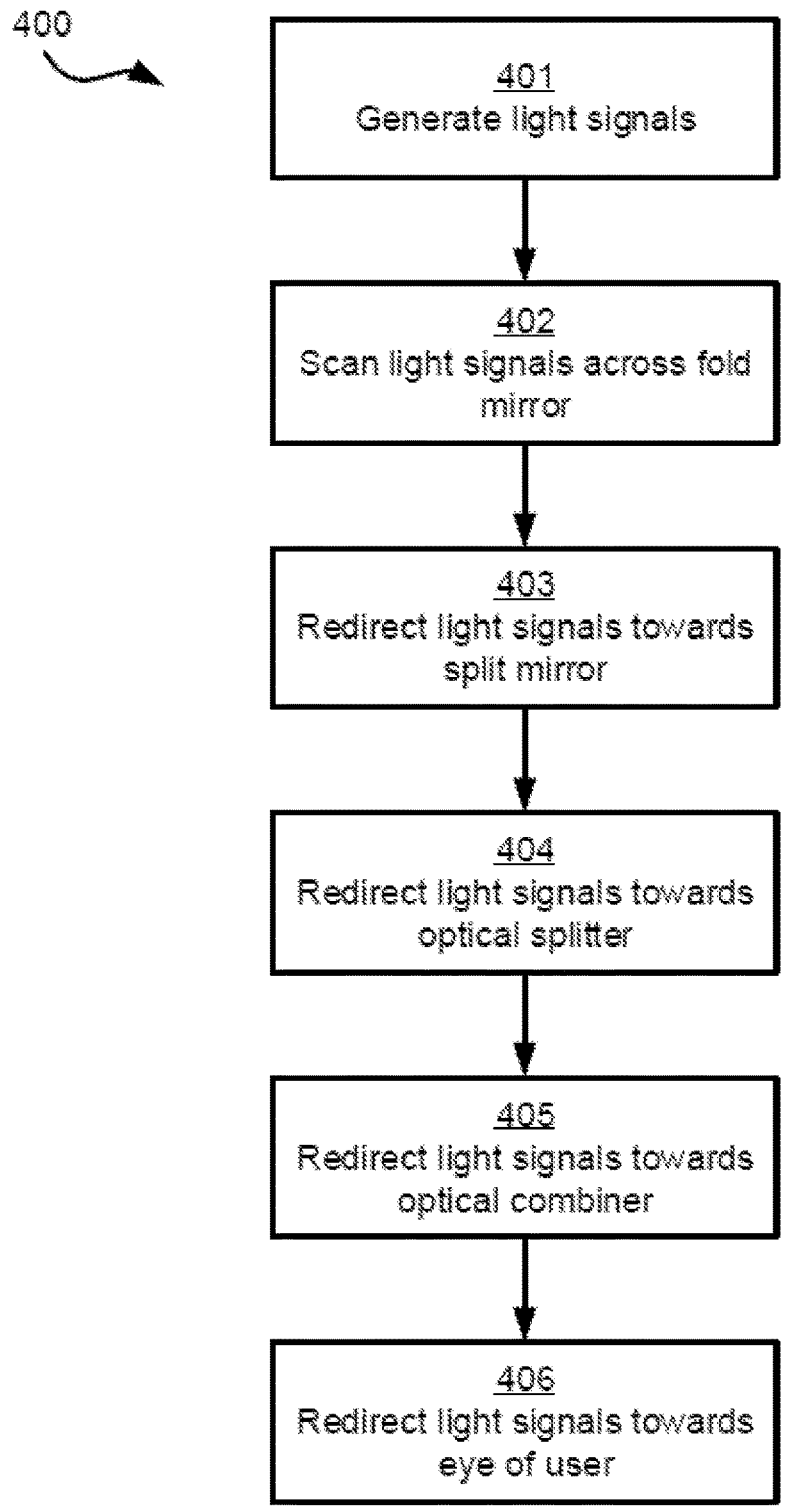
FIG. 4 is a flow-diagram showing a method of operating a wearable heads-up display with a scanning laser projector in accordance with the present systems, devices, and methods.

FIG. 4 is a flow-diagram showing a method 400 of operating a wearable heads-up display with a scanning laser projector in accordance with the present systems, devices, and methods. The wearable heads-up display of FIG. 4 may be similar to the WHUD 100 of FIG. 1, the WHUD 200 of FIG. 2, and the WHUD described in FIG. 3. The WHUD of FIG. 4 includes a scanning laser projector, a fold mirror movable between at least two states, a split mirror having at least two non-coplanar reflective surfaces, an optical splitter, and an optical combiner. The WHUD of FIG. 4 may include a support structure having the shape and appearance of eyeglasses. The WHUD positions a display in the field of view of an eye of a user when worn on a head of the user. The method 400 includes acts 401, 402, 403, 404, 405, and 406, though those of skill in the art will appreciate that in alternative embodiments certain acts may be omitted and/or additional acts may be added. Those of skill in the art will also appreciate that the illustrated order of the acts shown is for exemplary purposes only and may change in alternative embodiments.

At 401, the scanning laser projector generates light signals. These light signals may be generated by at least one laser diode, wherein a beam combiner combines multiple beams into an aggregate beam if multiple laser diodes are employed. The at least one laser diode may include a red laser diode to generate red laser light, a green laser diode to generate green laser light, and a blue laser diode to generate blue laser light. The WHUD may include a processor and a non-transitory processor-readable storage medium wherein the processor executes data and/or instructions from the non-transitory processor-readable storage medium to generate the light signals.

At 402, the light signals are scanned across a scan range of the scanning laser projector towards the fold mirror. The light signals may be scanned by at least one controllable mirror. The at least one controllable scan mirror may be one mirror that is controllably deformable or rotatable to scan in two dimensions or two scan mirrors that are each controllably deformable or rotatable in respective dimensions, the respective dimensions different from one another. Preferably 90%, and further preferably 100%, of the light signals scanned by the scanning laser projector may be incident on the fold mirror.

At 403, the fold mirror directs the light signals towards the split mirror. In particular, the fold mirror is movable between at least two states. In a first state, the fold mirror redirects the light signals to a first of at least two reflective surfaces of the split mirror. In a second state, the fold mirror redirects the light signals to a second of the at least two reflective surfaces of the split mirror. That is, in each state, the fold mirror may redirect the light signals towards a distinct and non-overlapping reflective surface of the split mirror. In other implementations, the fold mirror may be movable to a third state in which light is redirected to both the first and the second of the at least two reflective surfaces of the split mirror. In particular, as will be described in connection with 406, the optical combiner may converge the light signals to one of at least two exit pupils at or proximate the eye of the user. Thus, in the first state, the fold mirror may redirect the first light signal toward the first reflective surface of the split mirror to converge at a first exit pupil of the exit pupils, and in a second state, the fold mirror may redirect the second light signal toward the second reflective surface of the split mirror to converge at a second exit pupil of the exit pupils.

In some implementations, an eye tracking system of the WHUD may track a focal point of the eye of the user. The fold mirror may be moved accordingly between the first state and the second state based on respective proximities of a first exit pupil and a second exit pupil to the focal point. Specifically, at 403, the fold mirror, in the first state or the second state, may redirect the light signals towards the split mirror to result in convergence of the light signals at the appropriate exit pupil. In other implementations, the fold mirror may be moved between the first state and the second state based on respective portions of the field of view of the user to be illuminated. Specifically, at 403, the fold mirror, in the first state, may redirect the light signals towards the first reflective surface of the split mirror to illuminate a first portion of the field of view of the user. In the second state, the fold mirror may redirect the light signals towards the second reflective surface of the split mirror to illuminate a second portion of the field of view of the user. In at least some implementations, the first and the second states represent the extreme rotational positions or orientations (e.g., furthest clockwise; furthest counterclockwise) of the fold mirror during normal operation.

In some implementations, at 403, prior to redirecting the light signals to the split mirror, the fold mirror may redirect the light signals to an additional fold mirror movable between at least two additional states. Specifically, the fold mirror may receive a first light signal, a second light signal, a third light signal and a fourth light signal generated by the scanning laser projector. In the first state, the fold mirror may redirect the first light signal and the third light signal towards the additional fold mirror. In the second state, the fold mirror may redirect the second light signal and the fourth light signal towards the additional fold mirror. The additional fold mirror, in turn, may redirect the first light signal, the second light signal, the third light signal and the fourth light signal towards a respective one of the non-coplanar reflective surfaces of the split mirror. Specifically, in a first additional state, the additional fold mirror may redirect the first light signal towards a first reflective surface of the split mirror. In the first additional state, the additional fold mirror may redirect the second light signal towards a second reflective surface of the split mirror. In a second additional state, the additional fold mirror may redirect the third light signal towards a third reflective surface of the split mirror. In the second additional state, the additional fold mirror may redirect the fourth light signal towards the fourth reflective surface of the split mirror. Accordingly, in each combination of the at least two states and the at least two additional states, the fold mirror and the additional fold mirror may be arranged to redirect the light signals towards a respective one of at least four non-coplanar reflective surfaces of the split mirror. It will be appreciated that the fold mirror and the additional fold mirror may allow selection of the non-coplanar reflective surfaces in different axes (e.g., they may rotate orthogonal to one another). It will be further appreciated that the above may be extended to apply to further additional fold mirrors, or further states of each fold mirror to allow for selection of a respective one of the non-coplanar reflective surfaces of the split mirror.

At 404, the split mirror directs the light signals towards the optical splitter, wherein each respective light signal is directed towards the optical splitter at a respective angle of incidence. The split mirror has at least two reflective surfaces, and each reflective surface may reflect a discrete subset of the light signals towards the optical splitter. Each reflective surface may reflect light signals towards a distinct and non-overlapping region of the optical splitter. These distinct, non-overlapping regions of the optical splitter may be at least two non-coplanar input surfaces. The split mirror may comprise a single element having two reflective surfaces that are not co-planar, or may comprise two elements each with one reflective surface, wherein the two reflective surfaces are not co-planar. Preferably 90%, and further preferably 100%, of the light signals reflected by the split mirror may be incident on the optical splitter.

At 405, the optical splitter directs the light signals towards the optical combiner, wherein the path of a respective light signal is determined by the point of incidence and the angle of incidence of the respective light signal on the optical splitter. The optical splitter directs the light signals towards the optical combiner from N spatially-separated virtual positions, where N is an integer greater than 1. The optical splitter may have N input surfaces upon which the light signals are incident. These input surfaces may be angled with respect to the split mirror and not co-planar with each other or may apply different optical functions to the light signals incident thereon such that respective subsets of the light signals incident on respective input surfaces of the optical splitter are directed towards the optical combiner from different virtual positions (the virtual positions being different than the position of the light originating from at the split mirror). The optical splitter may have a single input surface and the optical functions applied to the respective subsets of light signals by the optical splitter may be applied within the optical splitter or at multiple non-coplanar output surfaces and may depend on the point of incidence and angle of incidence of a respective light signal on the single input surface of the optical splitter.

At 406, the optical combiner directs the light signals towards an eye of a user. The respective subsets of light signals which were directed towards the optical combiner from different virtual positions by the optical splitter are incident at the eye of the user as respective exit pupils. Further, the optical combiner can converge each of the respective subsets of light signals to the respective exit pupils at the eye of the user. In particular, the optical combiner may converge the light signals to one of at least two exit pupils at or proximate the eye of the user. Each respective subset of light signals may represent the same image, resulting in exit pupil replication at the eye of the user and a large eyebox. Alternatively, each subset of light signals may represent different portions of an image, resulting in an increased field of view where different portions of the display can be visible depending on where the user is looking. Further, since each respective subset of light signals is redirected from the fold mirror using the full usable resolution of the scanning laser projector, resolution of the image displayed at the exit pupil is increased.

A person of skill in the art will appreciate that the various embodiments for increasing resolution described herein may be applied in non-WHUD applications. For example, the present systems, devices, and methods may be applied in non-wearable heads-up displays and/or in other applications that may or may not include a visible display.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, each of US Patent Application Publication No. 2016-0377866 A1, US Patent Application Publication No. 2016-0377865 A1, US Patent Application Publication No. US 2014-0198034 A1, US Patent Application Publication No. US 2016-0238845 A1, US Patent Application Publication No. US 2014-0198035 A1, US Patent Application Publication No. 2018-0321494 A1, US Patent Application Publication No. 2018-0321495 A1, U.S. Non-Provisional patent application Ser. No. 15/046,234, U.S. Non-Provisional patent application Ser. No. 15/046,254, U.S. Non-Provisional patent application Ser. No. 15/145,576, U.S. Non-Provisional patent application Ser. No. 15/145,609, U.S. Non-Provisional patent application Ser. No. 15/147,638, U.S. Non-Provisional patent application Ser. No. 15/145,583, U.S. Non-Provisional patent application Ser. No. 15/256,148, U.S. Non-Provisional patent application Ser. No. 15/167,458, U.S. Non-Provisional patent application Ser. No. 15/167,472, U.S. Non-Provisional patent application Ser. No. 15/167,484, U.S. Non-Provisional patent application Ser. No. 15/381,883, U.S. Non-Provisional patent application Ser. No. 15/331,204, U.S. Non-Provisional patent application Ser. No. 15/282,535, U.S. Non-Provisional patent application Ser. No. 15/970,631, U.S. Non-Provisional patent application Ser. No. 15/970,645, U.S. Non-Provisional patent application Ser. No. 14/155,087, U.S. Non-Provisional patent application Ser. No. 14/155,107, U.S. Non-Provisional patent application Ser. No. 15/167,458, U.S. Non-Provisional patent application Ser. No. 15/827,667, U.S. Provisional Patent Application Ser. No. 62/271,135 U.S. Provisional Patent Application Ser. No. 62/268,892, U.S. Provisional Patent Application Ser. No. 62/322,128, U.S. Provisional Patent Application Ser. No. 62/420,368, U.S. Provisional Patent Application Ser. No. 62/420,371, U.S. Provisional Patent Application Ser. No. 62/420,380, U.S. Provisional Patent Application Ser. No. 62/438,725, U.S. Provisional Patent Application Ser. No. 62/374,181, U.S. Provisional Patent Application Ser. No. 62/482,062, U.S. Provisional Patent Application Ser. No. 62/557,551, U.S. Provisional Patent Application Ser. No. 62/557,554, U.S. Provisional Patent Application Ser. No. 62/565,677, U.S. Provisional Patent Application Ser. No. 62/573,978, U.S. Provisional Patent Application Ser. No. 62/501,587, U.S. Provisional Patent Application Ser. No. 62/501,587, U.S. Provisional Patent Application Ser. No. 62/236,060, U.S. Provisional Patent Application Ser. No. 62/658,436, PCT Patent Application PCT/US2014/057029, and U.S. Provisional Application No. 62/802,122 are all incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display (WHUD) comprising:
a support structure;
an optical combiner carried by the support structure and positioned in a field of view of a user when the support structure is worn by the user;
a scanning laser projector carried by the support structure, the scanning laser projector operable to output light signals;
an optical splitter carried by the support structure, the optical splitter comprising at least one optical element arranged to receive the light signals generated by the scanning laser projector and redirect each light signal towards the optical combiner;
a split mirror carried by the support structure, the split mirror comprising at least a first reflective surface and a second reflective surface, each of the first and second reflective surfaces to receive the light signals generated by the scanning laser projector and redirect the light signals toward the optical splitter, wherein the first reflective surface and the second reflective surface are non-coplanar; and
a fold mirror carried by the support structure, the fold mirror movable between at least a first state and a second state, wherein, in each state, the fold mirror is arranged to receive the light signals generated by the scanning laser projector, in the first state, the fold mirror is arranged in a first position to redirect the light signals toward the first reflective surface of the split mirror, in the second state, the fold mirror is arranged in a second position to redirect the light signals toward the second reflective surface of the split mirror, and the first position is different from the second position.

2. The WHUD of claim 1, wherein, in the first state, the fold mirror is arranged to redirect the light signals away from the second reflective surface of the split mirror, and in the second state, the fold mirror is arranged to redirect the light signals away from the first reflective surface of the split mirror.

3. The WHUD of claim 1, wherein, in a third state, the fold mirror is arranged to redirect the light signals simultaneously toward the first reflective surface and the second reflective surface of the split mirror.

4. The WHUD of claim 1, further comprising an additional fold mirror carried by the support structure, the additional fold mirror movable between at least two additional states, wherein, in each combination of the first and second states, and the at least two additional states, the fold mirror and the additional fold mirror are arranged to redirect the light signals toward a respective one of at least four non-coplanar reflective surfaces of the split mirror.

5. The WHUD of claim 1, wherein the optical splitter redirects each light signal towards the optical combiner effectively from one of N spatially-separated virtual positions for the scanning laser projector, where N is an integer greater than 1, the respective virtual position for the scanning laser projector from which a light signal is redirected by the optical splitter determined by a point of incidence at which the light signal is received by the optical splitter.

6. The WHUD of claim 1, wherein the optical combiner converges the light signals to at least two exit pupils at or proximate an eye of the user.

7. The WHUD of claim 6, wherein:
in the first state, the fold mirror is arranged to redirect the light signals toward the first reflective surface of the split mirror to converge at a first exit pupil of the at least two exit pupils; and
in the second state, the fold mirror is arranged to redirect the light signals toward the second reflective surface of the split mirror to converge at a second exit pupil of the at least two exit pupils.

8. The WHUD of claim 7, further comprising an eye tracking system carried by the support structure, the eye tracking system to detect a focal point of the eye of the user, wherein the fold mirror is movable between the first state and the second state based on respective proximities of the first exit pupil and the second exit pupil to the focal point.

9. The WHUD of claim 1, wherein:
in the first state, the fold mirror is arranged to redirect the light signals toward the first reflective surface of the split mirror to illuminate a first portion of the field of view of the user; and
in the second state, the fold mirror is arranged to redirect the light signals toward the second reflective surface of the split mirror to illuminate a second portion of the field of view of the user.

10. A method of operating a wearable heads-up display (WHUD), the wearable heads-up display including a scanning laser projector, a fold mirror movable between at least two states, a split mirror having two or more non-coplanar reflective surfaces, an optical splitter, and an optical combiner positioned within a field of view of an eye of a user when the wearable heads-up display is worn on a head of the user, the method comprising:
generating a first light signal and a second light signal by the scanning laser projector;
receiving, by the fold mirror, the first light signal and the second light signal;
redirecting, by the fold mirror in a first state of the at least two states, the first light signal towards a respective first reflective surface of the two or more non-coplanar reflective surfaces of the split mirror;
redirecting, by the fold mirror in a second state of the at least two states, the second light signal towards a respective second reflective surface of the two or more non-coplanar reflective surfaces of the split mirror;
redirecting, by the split mirror, the first light signal and the second light signal towards the optical splitter;
redirecting, by the optical splitter, the first light signal and the second light signal towards the optical combiner; and
redirecting, by the optical combiner, the first light signal and the second light signal towards the eye of the user.

11. The method of claim 10, further comprising:
generating a third light signal by the scanning laser projector;
receiving, by the fold mirror, the third light signal;
redirecting, by the fold mirror in a third state, the third light signal towards the first reflective surface and the second reflective surface of the split mirror;
redirecting, by the split mirror, the third light signal towards the optical splitter;
redirecting, by the optical splitter, the third light signal towards the optical combiner; and
redirecting, by the optical combiner, the third light signal towards the eye of the user.

12. The method of claim 10, wherein redirecting, by the optical splitter, the first light signal and the second light signal towards the optical combiner comprises:
redirecting, by the optical splitter, the first light signal towards the optical combiner effectively from a first one of N spatially-separated virtual positions for the scanning laser projector, where N is an integer greater than 1, the particular virtual position for the scanning laser projector from which the first light signal is redirected by the optical splitter determined by a point of incidence at which the first light signal is received by the optical splitter; and
redirecting, by the optical splitter, the second light signal towards the optical combiner effectively from a second one of the N spatially-separated virtual positions for the scanning laser projector, the particular virtual position for the scanning laser projector from which the second light signal is redirected by the optical splitter determined by a point of incidence at which the second light signal is received by the optical splitter.

13. The method of claim 10, further comprising converging, by the optical combiner, the first light signal to one of at least two exit pupils at or proximate the eye of the user.

14. The method of claim 13, further comprising:
in the first state, redirecting, by the fold mirror, the first light signal toward the first reflective surface of the split mirror to converge at a first exit pupil of the at least two exit pupils; and
in the second state, redirecting, by the fold mirror, the first light signal toward a second reflective surface of the split mirror to converge at a second exit pupil of the at least two exit pupils.

15. The method of claim 14, further comprising:
tracking, by an eye tracking system of the WHUD, a focal point of the eye of the user; and
moving the fold mirror between the first state and the second state based on respective proximities of the first exit pupil and the second exit pupil to the focal point.

16. The method of claim 10, further comprising:
in the first state, redirecting, by the fold mirror, the light signals toward the first reflective surface of the split mirror to illuminate a first portion of the field of view of the user; and
in the second state, redirecting, by the fold mirror, the light signals towards a second reflective surface of the split mirror to illuminate a second portion of the field of view of the user.

17. The method of claim 10, wherein generating the first light signal comprises:
outputting red laser light by a red laser diode of the scanning laser projector;
outputting green laser light by a green laser diode of the scanning laser projector;
outputting blue laser light by a blue laser diode of the scanning laser projector;
combining, by a beam combiner of the scanning laser projector, the red laser light, the green laser light and the blue laser light into an aggregate beam; and scanning, by at least one controllable mirror, the aggregate beam across the fold mirror.

18. A method of operating a wearable heads-up display (WHUD), the wearable heads-up display including a scanning laser projector, a fold mirror movable between at least two states, an additional fold mirror movable between at least two additional states, a split mirror having four or more non-coplanar reflective surfaces, an optical splitter, and an optical combiner positioned within a field of view of an eye of a user when the wearable heads-up display is worn on a head of the user, the method comprising:

generating a first light signal, a second light signal, a third light signal and a fourth light signal by the scanning laser projector;

receiving, by the fold mirror, the first light signal, the second light signal, the third light signal and the fourth light signal;

redirecting, by the fold mirror in a first state of the at least two states, the first light signal and the third light signal towards the additional fold mirror;

redirecting, by the fold mirror in a second state of the at least two states, the second light signal and the fourth light signal towards the additional fold mirror;

redirecting, by the additional fold mirror in a first additional state of the at least two additional states, the first light signal towards a first reflective surface of the four or more non-coplanar reflective surfaces of the split mirror;

redirecting, by the additional fold mirror in the first additional state, the second light signal towards a second reflective surface of the four or more non-coplanar reflective surfaces of the split mirror;

redirecting, by the additional fold mirror in a second additional state of the at least two additional states, the third light signal towards a third reflective surface of the four or more non-coplanar reflective surfaces of the split mirror;

redirecting, by the additional fold mirror in the second additional state, the fourth light signal towards a fourth reflective surface of the four or more non-coplanar reflective surfaces of the split mirror;

redirecting, by the split mirror, the first light signal, the second light signal, the third light signal and the fourth light signal towards the optical splitter;

redirecting, by the optical splitter, the first light signal, the second light signal, the third light signal and the fourth light signal towards the optical combiner; and redirecting, by the optical combiner, the first light signal, the second light signal, the third light signal and the fourth light signal towards the eye of the user.

19. A wearable heads-up display (WHUD) comprising:

a support structure;

an optical combiner carried by the support structure and positioned in a field of view of a user when the support structure is worn by the user; a scanning laser projector carried by the support structure, the scanning laser projector operable to output light signals, wherein the optical combiner converges the light signals to at least two exit pupils at or proximate an eye of the user; an optical splitter carried by the support structure, the optical splitter comprising at least one optical element arranged to receive the light signals generated by the scanning laser projector and redirect each light signal towards the optical combiner; a split mirror carried by the support structure, the split mirror comprising at least two non-coplanar reflective surfaces to receive the light signals generated by the scanning laser projector and redirect the light signals toward the optical splitter; and a fold mirror carried by the support structure, the fold mirror movable between at least two states, wherein, in each state, the fold mirror is arranged to receive the light signals generated by the scanning laser projector and redirect the light signals toward a respective one of the at least two non-coplanar reflective surfaces of the split mirror, in a first state of the at least two states, the fold mirror is arranged to redirect the light signals toward a first reflective surface of the split mirror to converge at a first exit pupil of the at least two exit pupils, and, in a second state of the at least two states, the fold mirror is arranged to redirect the light signals toward a second reflective surface of the split mirror to converge at a second exit pupil of the at least two exit pupils.

* * * * *